(12) United States Patent
Chen et al.

(10) Patent No.: US 6,792,501 B2
(45) Date of Patent: Sep. 14, 2004

(54) UNIVERSAL SERIAL BUS FLASH MEMORY INTEGRATED CIRCUIT DEVICE

(75) Inventors: Chien-An Chen, Taipei (TW); Khein-Seng Pua, Hsinchu (TW)

(73) Assignee: Phision Electronic Corp, Hsinchu Hsien (TW)

( * ) Notice: Subject to any disclaimer, the term of this patent is extended or adjusted under 35 U.S.C. 154(b) by 239 days.

(21) Appl. No.: 10/059,126

(22) Filed: Jan. 31, 2002

(65) Prior Publication Data
US 2003/0145141 A1 Jul. 31, 2003

(51) Int. Cl.[7] .............................................. G06F 12/00
(52) U.S. Cl. ...................................... 711/103; 711/115
(58) Field of Search ................................ 711/103, 115; 365/185.33

(56) References Cited

U.S. PATENT DOCUMENTS

| | | | | |
|---|---|---|---|---|
| 5,528,317 A | * | 6/1996 | Gove et al. ................. 348/743 |
| 6,081,870 A | * | 6/2000 | Roohparvar ................. 711/103 |
| 6,148,354 A | * | 11/2000 | Ban et al. ................... 710/301 |
| 6,170,743 B1 | * | 1/2001 | Okaue et al. ............... 235/380 |
| 6,266,724 B1 | * | 7/2001 | Harari et al. ............... 710/301 |
| 6,438,638 B1 | * | 8/2002 | Jones et al. ................. 710/301 |
| 2002/0035661 A1 | * | 3/2002 | Roohparvar ................. 711/103 |
| 2002/0147882 A1 | * | 10/2002 | Pua et al. .................... 711/103 |
| 2002/0178307 A1 | * | 11/2002 | Pua et al. ...................... 710/62 |
| 2003/0167376 A1 | * | 9/2003 | Koh ............................. 711/115 |

* cited by examiner

Primary Examiner—Hiep T. Nguyen

(57) ABSTRACT

The invention provides a flash memory integrated circuit device that is connectable to a computer via a universal serial bus. The universal serial bus (USB) has become a standard serial interface, which allows data to be stored in and read from an external memory device at high speed. Therefore, it is advantageous to combine the benefits of a flash memory device with the speed of the universal serial bus. In addition, by designing the flash memory device with a USB interface, the flash memory device appears as a standard USB storage device, which permits the host and flash memory device to connect and interact with ease.

14 Claims, 15 Drawing Sheets

| Offset | Field | Size | Value | Description |
|---|---|---|---|---|
| 0 | BmRequest-Type | 1 | bitmap | Characteristics of request:<br>D7:Data transfer direction<br>    0:host to device<br>      (Write)<br>    1:device to host<br>      (Read)<br>D6..5:Type<br>    0:Standard<br>    1:Class<br>    2:Vendor<br>    3:Reserved<br>D4..0:Recipient<br>    0:Device<br>    1:Interface<br>    2:Endpoint<br>    3:Other<br>    4-31:Reserved |
| 1 | BRequest | 1 | value | Specific request |
| 2 | WValue | 2 | value | Word sized field that varies according to request |
| 4 | WIndex | 2 | index or off- | Word sized field that varies according to request |
| 6 | WLength | 2 | count | Number of bytes to trans-fer |

*FIG.5*

| 0000h | 0000h |
|-------|-------|
| 0001h | 0001h |
| 0002h | 0002h |
| 0003h | 0003h |
| ⋮ | ⋮ |
| 03DEh | 03DEh |
| 03DFh | 03DFh |

| 03E0h | 0000h |
|-------|-------|
| 0001h | 0001h |
| 0002h | 0002h |
| 0003h | 0003h |
| ⋮ | ⋮ |
| 03DEh | 03DEh |
| 03DFh | 03DFh |

| Byte 0 | R/W Flag |
| --- | --- |
| Byte 1 | Sector Number |
| Byte 2 | Cylinder LOW |
| Byte 3 | Cylinder High |
| Byte 4 | Device/Head |
| Byte 5 | Sector Count |

*FIG. 15*

UNIVERSAL SERIAL BUS FLASH MEMORY INTEGRATED CIRCUIT DEVICE

BACKGROUND OF THE INVENTION

1. Field of Invention

The present invention relates to a flash memory device, and more particularly, to a universal serial bus flash memory integrated circuit that is connectable via a universal serial bus.

2. Description of Related Art

Flash memory has become an important means for storing data for the advantage of high mobility and non-erasable. This is an extremely useful way of storing data for portable devices such as handheld devices. The convenience that flash memory provides gives it numerous advantages over traditional mass storage devices such as hard disks. Besides portability, flash memory further offers advantages such as low power consumption, reliability, small size and high speed.

Flash memory is non-volatile which means that it retains its stored data even after power is turned off. This is an improvement over standard random access memory (RAM), which is volatile and therefore looses stored data when power is turned off.

Universal serial transmission interface is the standard of PC/NB/IA products. PC/NB/IA products are bootable by storage medium of serial transmission interface, thereby increasing the possibility of substituting serial transmission interface storage medium for hard diskdrive. Due to external attachment arrangement, existing serial transmission interface storage media cause certain inconveniences.

In order to fit different function requirements, current small-sized IA products, such as PDA, industrial computer, digital camera, and the like are commonly provided with an operation system, for example, Win CE/Linux. The hardware architecture requires a CPU and a NOR type flash memory for storing program code. If it is necessary to store data, SRAM or built-in NAND flash memory, or external memory card is needed. The aforesaid three measures are not of standard interface to Win CE/Linux. The designer needs to modify the driving program or application program of these operation systems. Therefore, it requires much effort and money on these interfaces when developing a new product.

As the number of mobile, portable, or handheld devices grows, the popularity of flash memory increases. The most common type of flash memory is in the form of a removable memory card. This card allows the contents of the flash memory to be transferred easily between devices or computers.

However, when moving the flash memory card between devices, an additional host or adapter is required in order for the host to communicate with the flash card. Many devices may not have the built-in ability to connect to a flash card, therefore a special adapter or card must be installed in the host device. In addition, the bus architecture can limit the speed of data transfer between the host and flash memory device.

Therefore, there is a need for a flash memory device that can be directly connected to a host device without the need for special cables or adapters.

SUMMARY OF THE INVENTION

To achieve these and other advantages and in order to overcome the disadvantages of a conventional flash memory card in accordance with the purpose of the invention as embodied and broadly described herein, the present invention provides a flash memory integrated circuit device that is connectable to a host via a universal serial bus.

The universal serial bus (USB) has become a standard serial interface, which allows data to be stored in and read from an external memory device at high speed. Therefore, it is advantageous to combine the benefits of a flash memory device with the speed of the universal serial bus. In addition, by designing the flash memory device with a USB interface, the flash memory device appears as a standard USB storage device, which permits the host and flash memory device to connect and interact with ease.

The main board of the flash memory integrated circuit device comprises a controller and at least one flash memory chip. A USB connector connects the flash memory integrated circuit device with a USB host. The flash memory on the main board comprises at least one flash memory chip but as described below, the memory capacity of the flash memory device can be easily expanded.

In an embodiment of the present invention, the memory storage device further comprises an extension stack connector that allows for extending the number of flash memories on slave boards. The extension stack connector connects the pins needed by the flash memory chip on the slave board with the controller on the main board. In this way, the memory capacity of the flash memory device can be conveniently expanded as required.

The controller is a major component of the device. The controller controls commands and data between the USB host and manages data in the flash memory array or module. It is preferred that the controller is of a single chip design that does not need external ROM or RAM.

A regulator regulates the voltage for the memory storage device. Typically, flash memory requires 3.3 volts or 5.0 volts. Some flash memory devices utilize means of switching between 3.3 volts and 5.0 volts as required by the flash memory. However, an advantage of the flash memory device of the present invention is that the flash memory device only needs 3.3 volts. Therefore, regardless if 5.0 volts or 3.3 volts is received from the host, the regulator will ensure that 3.3 volts is available for the USB transceiver without the need for detecting and converting the voltage.

A clock generator, for example a crystal, generates a clock signal for the controller of the flash memory device.

The flash memory integrated circuit device of an embodiment of the present invention further comprises an indicator, for example an LED indicator, which indicates the status of the memory storage device such as whether it is busy or in standby.

The main board of the flash memory device can also have a stack connector for connecting a slave board to the main board for extending the memory size with flash memory arrays. The slave board comprises at least one additional flash memory module or array. Multiple slave boards can be connected in order to provide unlimited memory expansion.

A write protection switch provides write protection from the USB host. The switch has at least two positions; a position for allowing the host to read and write normally, and another position for write protection. When the switch is in the write protect position, the host can read data but cannot write or erase data.

The controller of the flash memory device of the present invention performs numerous functions. Among these functions is controlling the USB interface. The controller follows the USB specification for physical and logical protocol. The controller further comprises a FIFO controller buffer. The controller receives command and parameter packets from the USB host, which are then stored in a special register defined by the controller. The controller is also responsible for controlling the transfer of data to and from the USB host. In addition, the controller also provides status data to the USB host.

When the host sends a write command, an interrupt is generated and sent to the controller microprocessor to inform the microprocessor of the command and the command location. The microprocessor, for example an 8 or 16-bit microprocessor, is a major component of the controller. The microprocessor reads the USB commands and parameters from the register. The microprocessor also executes the commands with parameters. The microprocessor manages and maps the USB FIFO address to the controller buffer while receiving or transferring data to and from the USB host. Also, the microprocessor manages commands such as erase, program, or read for the flash memory array. In addition, the microprocessor executes the addressing method according to the algorithm of the controller.

Microprocessor ROM stores the program code of the controller and is built into the controller. Microprocessor RAM is a system RAM used by the controller when executing USB commands or the flash algorithm. By eliminating the requirement for off-chip memory, the system cost is reduced.

A system buffer is used as a cache, which is provided for buffering between the USB interface and the flash memory array interface. It is also the FIFO of the USB protocol and the direction map to the buffer. The microprocessor manages the addresses of this buffer. As required, the buffer can be accessed by byte or word.

The flash memory integrated circuit device of the present invention further comprises a hardware state machine for creating the read and write timing to the system buffer between the USB host and the flash memory. A flash interface and circuit, controls the read and write commands to the flash memory array. In an embodiment of the present invention this is a pure hardware circuit.

In addition, an ECC circuit encodes the ECC code while data is writing to the flash memory array from the buffer cache and decodes the ECC code while data is read from the flash memory array to the buffer cache. If an ECC error occurs, the ECC circuit will determine the word or byte address in the buffer cache and correct the error.

The USB command implementation comprises the controller receiving commands and parameters from the USB host and storing them in a register defined by the controller. An interrupt is generated and sent to inform the microprocessor that a command has been received.

The controller receives and transfers data to and from the USB host according to the USB logical and physical specification. The addressing method comprises managing the flash memory erase, read, and write commands and manages the physical to logical mapping.

When the USB Host writes a command and parameter to the memory storage device, the controller will store it in a specified register. The data will then be read by the microprocessor as information from the USB host. According to the standard USB specification, the request parameter comprises 7 bits as shown in FIG. 5. Bits D6-D5 of the bmRequest Type designate the type of command protocol. The types include standard, class, and vendor. The flash memory device of the present invention supports all three of these types of protocols. The standard type is the standard device request, which is a common command such as USB_Get_Status or USB_set_Feature.

An embodiment of the flash memory integrated circuit device of the present invention utilizes the USB mass storage class with the bulk/control/interrupt transport.

Due to the physical limit of the flash memory, before the write command can be performed, an erase command must be executed first. Typical flash memory can function normally only until being erased about one million times, so minimizing the erase steps to maximize the flash memory's usage life is very important. Therefore, the present invention provides a link table and a mother/child framework to achieve this aim.

Following is a description of the use of the link table. When initializing flash, all blocks are searched and a record of the relationship between the physical and logical block that the search has found, becomes the link table. At the same time, the unused physical blocks are put into the spare region for the FIFO queue to use. Next, the logical block in the Link Table is used to find the corresponding physical block address. By doing so, data associated with a particular physical block can accurately be written or retrieved.

When writing data to the flash memory, an erased block (new block) may need to be taken to replace an old block. Then data is written into the new block. Finally, the data, which has been not changed, is moved from the old block to the new block. This completes the action of writing a page's data.

If multiple pages of data are to be written, the above steps are repeated. However, if data is repeatedly written into the same block, many unnecessary erase and move actions are performed. This not only wastes time but also reduces the lifetime of the flash. Therefore, in the flash memory device of the present invention, the erase action is avoided when repeatedly writing data to the same block and the move action is performed only when changing blocks. By using this method, not only is the lifetime of the flash increased but the efficiency of the device is also increased.

Following is a write data example. 32 sectors of data are to be written to flash which starts at block/page 0/0. The total physical block/logical block is 1024/992. The total spare blocks for the FIFO is 32. No blocks are defective. There are 32 pages per block. Child block number 03E0h, which is pointed to by the head pointer is taken from the FIFO spare region. The head pointer is then incremented and 32 pages of data are programmed into the child block. Child block number 03E0h is filled into the mother block's logical block address 0000h in the link table. Mother block 0000h is erased and the tail pointer is incremented. Then, mother block number 0000h is filled into the tail pointer point address in the spare region.

Following is a description of a write procedure according to an embodiment of the present invention.

The host writes the corresponding write command and the address parameter to the memory storage device which then begins execution of the program flash algorithm. Then, the logical address from the USB host is converted to the flash memory physical block and page address. The controller checks to see if a child block exists.

If a child block doesn't exist, a clean block is taken from the FIFO queue to create a child block for the current write command. Then, the current flash memory logical page number is checked to see if what is to be written is equal to "0" or not. If equal to "0", the data from the host to the flash memory is programmed into the buffer and the sector count number is decremented. This process is repeated until the sector count number is equal to "0". If what is to be written is not equal to "0", the data from the mother block (which is clean) is moved to the child block between the sections "last page written" and the "current write page". Then, the data from the host to the flash memory is programmed into the buffer and the sector count number is decremented. This process is repeated until the sector count number is equal to "0".

If a child block exists, the current flash memory's logical block is checked to see if what is to be written is equal to the last flash memory logical block that was written. If it is not equal, the data from the mother block is moved to the child block between the sections "last page written" and the "end page of this block". Then, the mother block is erased. The link table in the controller is updated substituting the original mother block address with the child block address. Then, the erased mother block is put back into the FIFO queue as a clean block. If what is to be written is equal to the last flash memory logical block that was written, the current flash memory logical page number is checked to see if what is to be written is larger than the last flash memory logical page that was written. If it is larger, the current write page number is checked to see if it is equal to the last page written plus 1. If yes, the data from the host to the flash memory is programmed into the buffer and the sector count number is decremented. This programming process is repeated until the sector count number is equal to "0". If the current write page number is not equal to the last page written plus 1, the data from the mother block (which is clean) is moved to the child block between the sections "last page written" and the "current write page".

If what is to be written is not larger than the last flash memory logical page that was written, the data from the mother block is moved to the child block between the sections "last page written" and the "end page of this block". Then, the mother block is erased. The link table in the controller is updated substituting the original mother block address with the child block address. Then, the erased mother block is put back into the FIFO queue as a clean block.

If what is to be written is larger than the last flash memory logical page that was written, the data from the mother block is moved to the child block between the "last page written" and the "current write page" sections. The data from the host to the flash memory is programmed into the buffer and the sector count number is decremented. The data is programmed until the sector count number equals zero.

For a read procedure of the flash memory device according to an embodiment of the present invention, the logical address from the USB host is converted to the flash memory physical block and page address. Then, the current flash memory logical block is checked to see if what is to be read is equal to the last flash memory logical block that was read. If no, the data from the flash memory physical block and page is read and the sector count number is decremented. This process is repeated until the sector count number equals "0". If what is to be read is equal to the last flash memory logical block that was read, the current flash memory logical page is checked to see if what is to be read is larger than the last flash memory logical page that was written.

If yes, the data from the flash memory physical block and page is read and the sector count number is decremented. This process is repeated until the sector count number equals "0". If what is to be read is not larger than the last flash memory page that was written, the data from the child block physical block and page is read and the sector count number is decremented. This process is repeated until the sector count equals "0".

When the microprocessor begins to execute the command, the device will download its parameters from the host, for example, read or write, the vendor command packet. The system will judge the address mode by bit 6 of the Device/Head byte. The flash memory device of the present invention supports both the logical block address (LBA) and the cylinder head sector (CHS) mode. If the host provides the address using LBA mode, the device will convert it into CHS mode and then change the CHS mode into the physical address.

When the device executes a read command, the controller will first read data from the flash memory, sector by sector to a buffer (512 bytes) in the controller, then this sector will be sent to the host by a USB engine. The whole command will be completed when the number of sectors that have been sent to the host is equal to the sector count.

When the device executes a write command, the controller will read data from the host by the USB engine sector by sector to a buffer (512 bytes) in the controller, and then this sector will be stored in the flash memory. The whole command will be completed when the number of sectors that have been sent to the flash memory is equal to the sector count.

The device can support more than one piece of flash memory. In the present invention, multiple chip select pins are provided. When the device is initialized, it will check the type of the flash (the capacity) being used on board and how many chips the system has and the device will add up all the memory chips to find out the total capacity. When the host needs this kind of data, the device will provide the total capacity to the host, not just the capacity of one chip.

When the host sends a certain address (logic) to the device, the device will perform a calculation to find the exact chip and corresponding address that the host wants to access. Then the device will use the calculated address and enable the chip select pin.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 5 is a table listing parameters of the USB protocol implemented in the flash memory device according to an embodiment of the present invention.

FIG. 11 is a diagram showing the link table according to an embodiment of the present invention.

FIG. 13 is a diagram showing the link table before programming according to an embodiment of the present invention.

FIG. 15 is a diagram showing a command packet structure according to an embodiment of the present invention.

DESCRIPTION OF THE PREFERRED EMBODIMENTS

Figure 1:
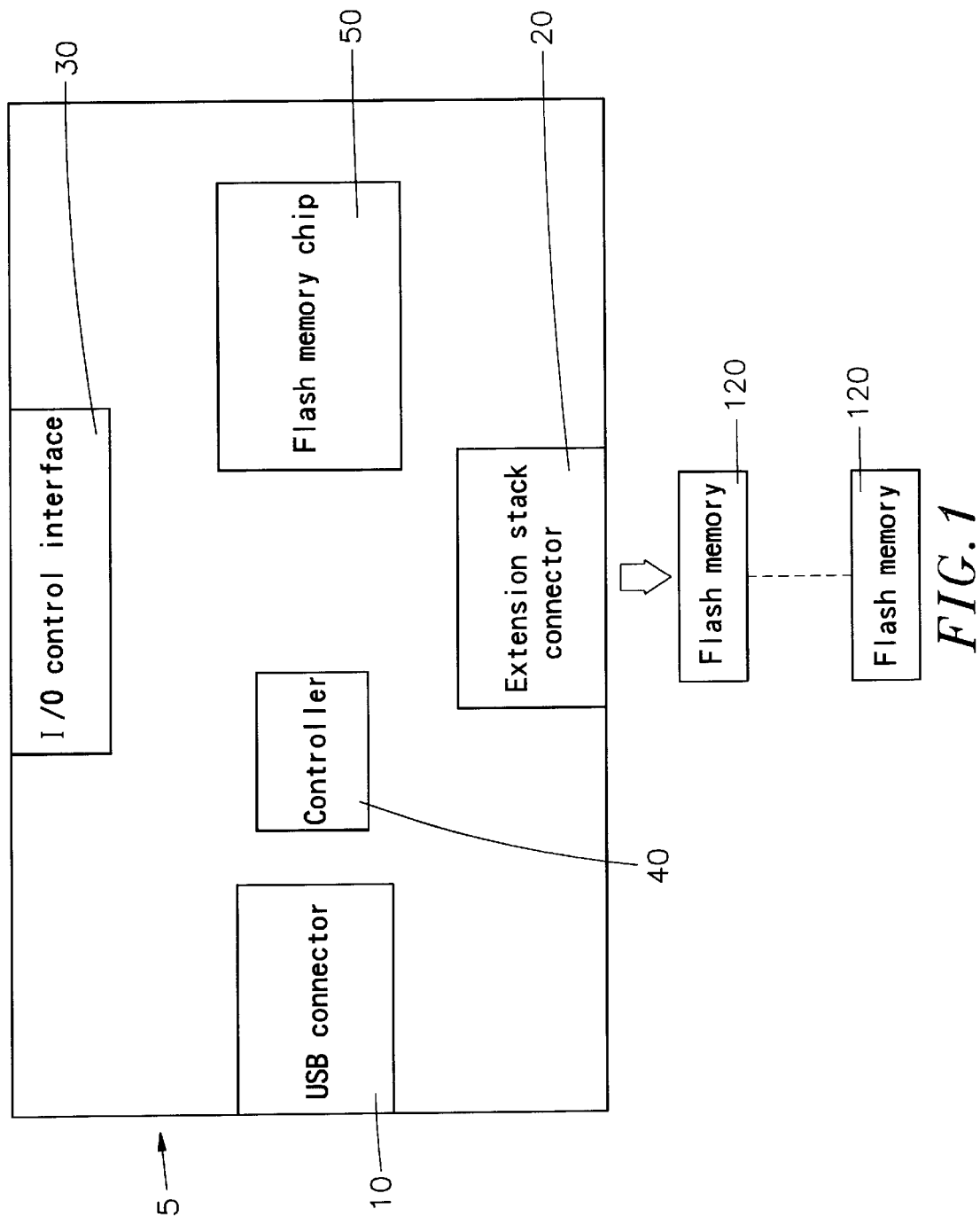
FIG. 1 is a diagram showing a layout of the universal serial bus flash memory integrated circuit device according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Referring to FIG. 1, the universal serial bus flash memory integrated circuit device, referenced by 5, comprises a controller 40, at least one flash memory chip 50, a USB connector 10 adapted for connecting the flash memory integrated circuit device 5 to an external USB host (not shown). The universal serial bus flash memory integrated circuit device 5 further comprises an extension stack connector 20 that allows for extending a number of flash memories 120. The extension stack connector 20 connects flash memory (or flash memories) 120 to the controller 40. In this way, the memory capacity of the universal serial bus flash memory device 5 can be conveniently expanded as required.

The controller 40 is the major component of the device. The controller 40 controls commands and data between the USB connector 10 and the USB host and, manages data in the at least one flash memory chip 50 and the connected flash memory or memories 120. It is preferred that the controller 40 is of a single chip design that does not need external ROM or RAM.

The universal serial bus flash memory integrated circuit device 5 further comprises an I/O (input/output) control interface 30 for system input/output control.

Figure 2:
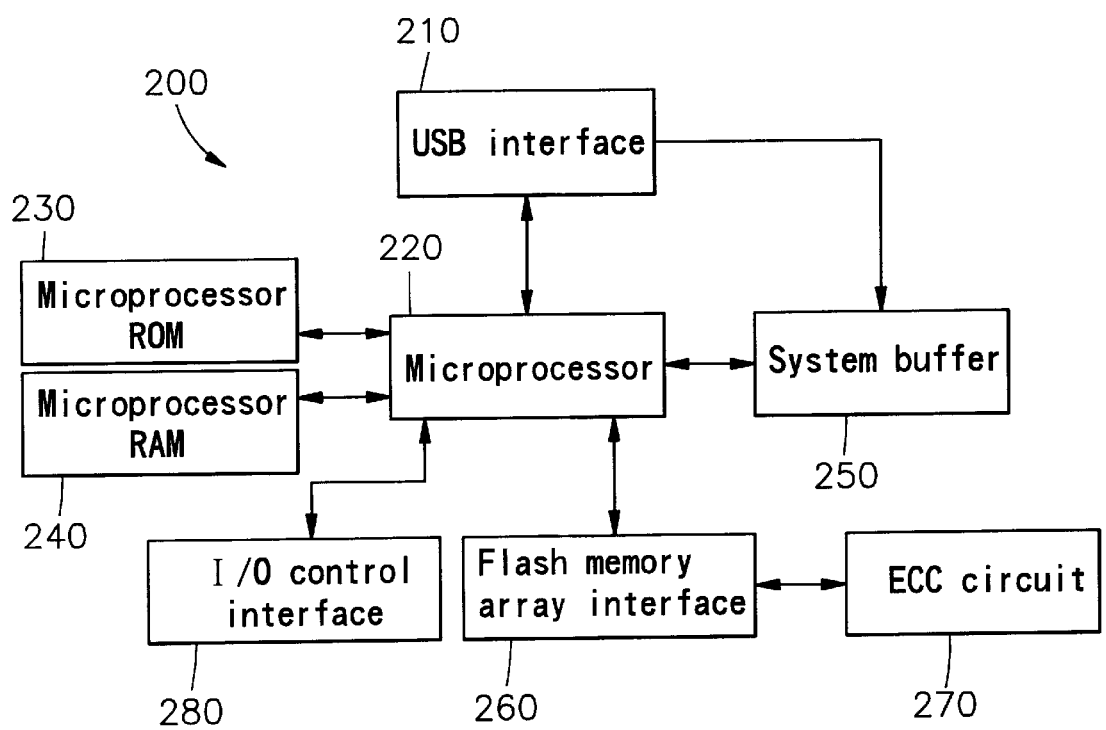
FIG. 2 is a block diagram of a flash memory integrated circuit device controller according to an embodiment of the present invention.

Refer to FIG. 2, which is a block diagram of a flash memory integrated circuit device controller 200 according to the present invention.

The controller 200 provides a numerous functions. Among these functions is controlling the USB interface 210.

The controller 200 is designed subject to the USB specification for physical and logical protocol. The controller 200 further comprises a system buffer 250 or FIFO controller buffer.

The controller 200 receives command and parameter packets from the USB host, which are then stored in the system buffer 250 defined by the controller 200. The controller 200 is also responsible for controlling the transfer of data to and from the USB host.

In addition, the controller 200 also provides status data to the USB host.

When the host sends a write command, an interrupt is generated and sent to the controller microprocessor, referenced by 220, to inform the microprocessor 220 of the command and the command location.

The microprocessor 220, for example an 8 or 16-bit microprocessor, is the major component of the controller 200. The microprocessor 220 reads the USB commands and parameters from the system buffer 250, and also executes the commands with parameters.

The microprocessor 220 manages and maps the USB FIFO address to the controller system buffer 250 while receiving or transferring data to and from the USB host.

Also, the microprocessor 220 manages commands such as erase, program, or read for the flash memory array. In addition, the microprocessor 220 executes the addressing method according to the algorithm of the controller 200.

Microprocessor ROM, referenced by 230, stores the program code of the controller 200, which is built in the controller 200. Microprocessor RAM, referenced by 240, is a system RAM used by the controller 200 when executing USB commands or the flash algorithm. By eliminating the requirement for off-chip memory, the system cost is reduced.

A system buffer 250 is used as a cache, which is provided for buffering between the USB interface 210 and the flash memory array interface, referenced by 260. It is also the FIFO of the USB protocol and the direction map to the buffer. The microprocessor 220 manages the addresses of this buffer. As required, the buffer can be accessed by byte or word.

The flash memory integrated circuit device of the present invention further comprises a hardware state machine for creating the read and write timing to the system buffer 250 between the USB host and the flash memory.

The flash memory array interface 260 controls the read and write commands to the flash memory array. According to the present invention, the flash memory array interface 260 is a pure hardware circuit.

An ECC circuit 270 encodes the ECC code while data is writing from the system buffer 250 to the flash memory array interface 260 and decodes the ECC code while data is read from the flash memory array interface 260 to the system buffer 250. If an ECC error occurs, the ECC circuit 270 will determine the word or byte address in the buffer cache and correct the error.

The I/O control interface. Referenced by 280, enables the system to run other input/output controls.

Figure 3:
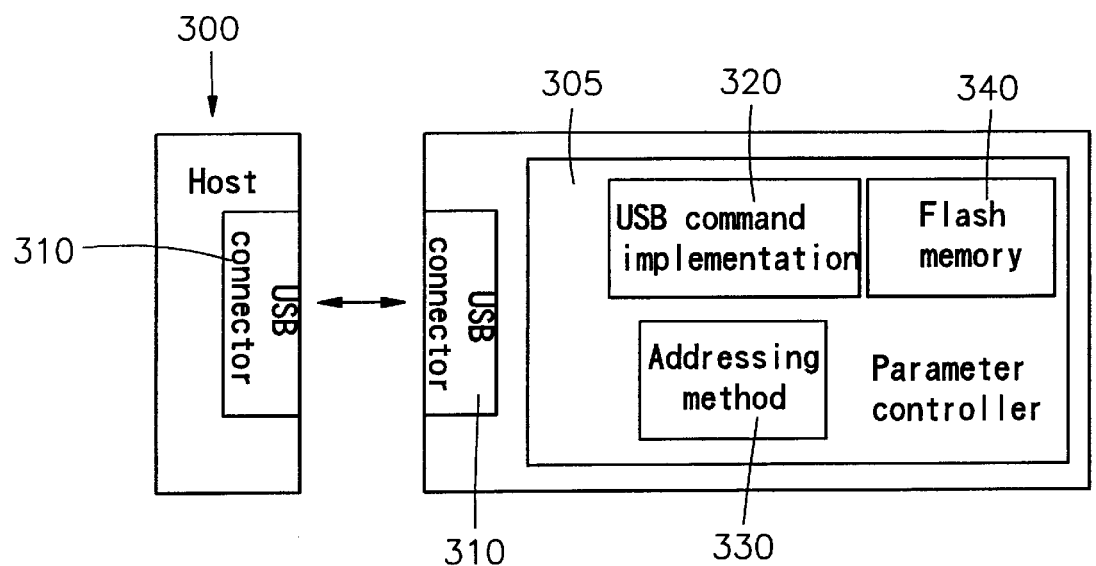
FIG. 3 is a block diagram showing the system architecture of a flash memory integrated circuit device according to an embodiment of the present invention.

FIG. 3 is a block diagram of the system architecture of a flash memory integrated circuit device constructed according to the present invention.

Certain operating systems of the USB host 300 such as Windows ME and Windows 2000 contain default USB device drivers. Other operating systems may require the need for a USB device driver to be installed on the host.

The USB command implementation, referenced by 320, receives commands and from the USB host 300 and a parameter controller 305 via a USB connector 310, stores received commands in a register defined by the parameter controller 305, and outputs an interrupt to inform the microprocessor of the reception of a command.

The controller 305 receives and transfers data to and from the USB host 300 subject to USB logical and physical specifications.

The addressing method, referenced by 330, is adapted to manage flash memory 340 erase, read, and write commands as well as physical to logical mapping.

Figure 4:
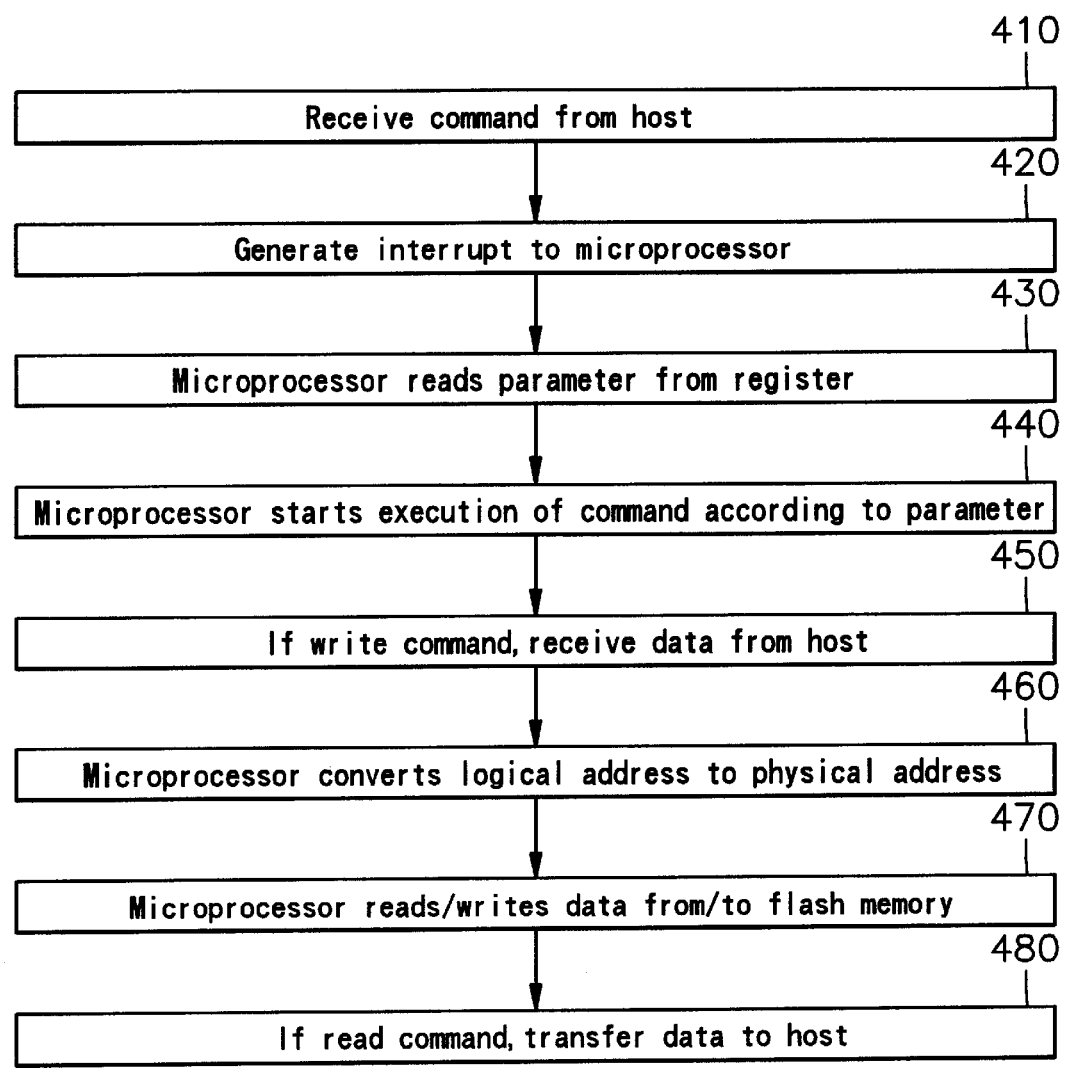
FIG. 4 is a flowchart showing the application of the USB protocol for various operating systems according to an embodiment of the present invention.

FIG. 4 is a flowchart of the application of the USB protocol for various operating systems. When the USB Host writes a command and parameter to the memory storage device in Step 410, the controller will store it in a specified register and generates an interrupt to the microprocessor in Step 420. The data will then be read by the microprocessor as information from the USB host in Step 430.

In Step 440, the microprocessor begins execution of the command according to the parameter. If the command is a write command, the data from the USB host to the buffer cache is received in Step 450.

The microprocessor then converts the logical address to the flash memory physical address in Step 460. The microprocessor then reads/writes data to/from flash memory in Step 470.

In Step 480, the data is transferred to the USB host if the command is a read command.

According to the standard USB specification, the request parameter comprises 7 bits as shown in FIG. 5.

Bits D6-D5 of bmRequest Type designate the type of command protocol. The types include standard, class, and vendor. The flash memory device of the present invention supports all three of these types of protocols.

The standard type is the standard device request, which is a common command such as USB_Get_Status or USB_set_Feature.

An embodiment of the flash memory integrated circuit device of the present invention utilizes the USB mass storage class with the bulk/control/interrupt transport.

Due to the physical limit of the Flash RAM, before the write command can be done, an erase command must be executed first. Typical flash memory can function normally only until being erased about one million times, so minimizing the erase steps to maximize the flash memory's usage life is very important. Therefore, the present invention provides a link table and a mother/child framework to achieve this aim.

Following is a description of the use of the link table. When initializing flash, all blocks are searched and a record of the relationship between the physical and logical block that the search has found, becomes the link table. At the same time, the unused physical blocks are put into the spare region for the FIFO queue to use.

Next, the logical block in the Link Table is used to find the corresponding physical block address. By doing so, data associated with a particular physical block can accurately be written or retrieved.

Figure 8:
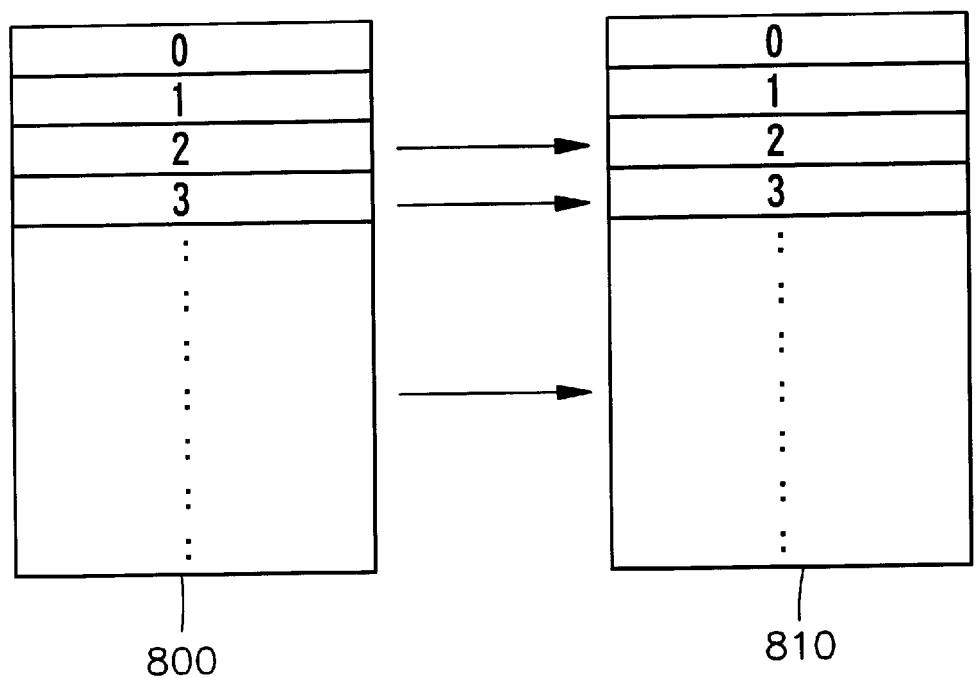
FIG. 8 is a block diagram showing writing data to a new block according to an embodiment of the present invention.

Refer to FIG. 8, which is a block diagram showing writing data to a new block according to the present invention. When writing data to the flash memory, an erased block (new block) 810 may need to be taken to replace an old block 800. Then, data is written into the new block 810. Finally, the unchanged data is moved from the old block 800 to the new block 810. This completes the action of writing a page's data.

Figure 9:
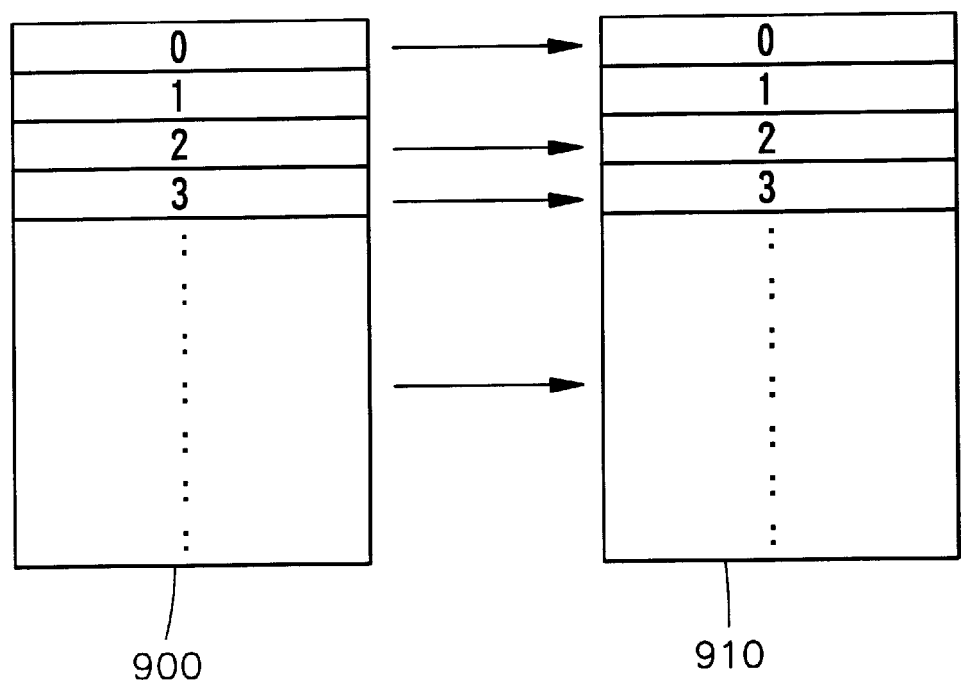
FIG. 9 is a block diagram showing writing additional pages of data according to an embodiment of the present invention.

If multiple pages of data are to be written, the above steps are repeated. Refer to FIG. 9, which is a block diagram showing writing additional pages of data according to the present invention. Data is written into the new block 910 and the unchanged data is moved from the old block 900 to the new block 910.

However, if data is repeatedly written into the same block, many unnecessary erase and move actions will be performed. This not only wastes time but also reduces the lifetime of the flash.

Figure 10:
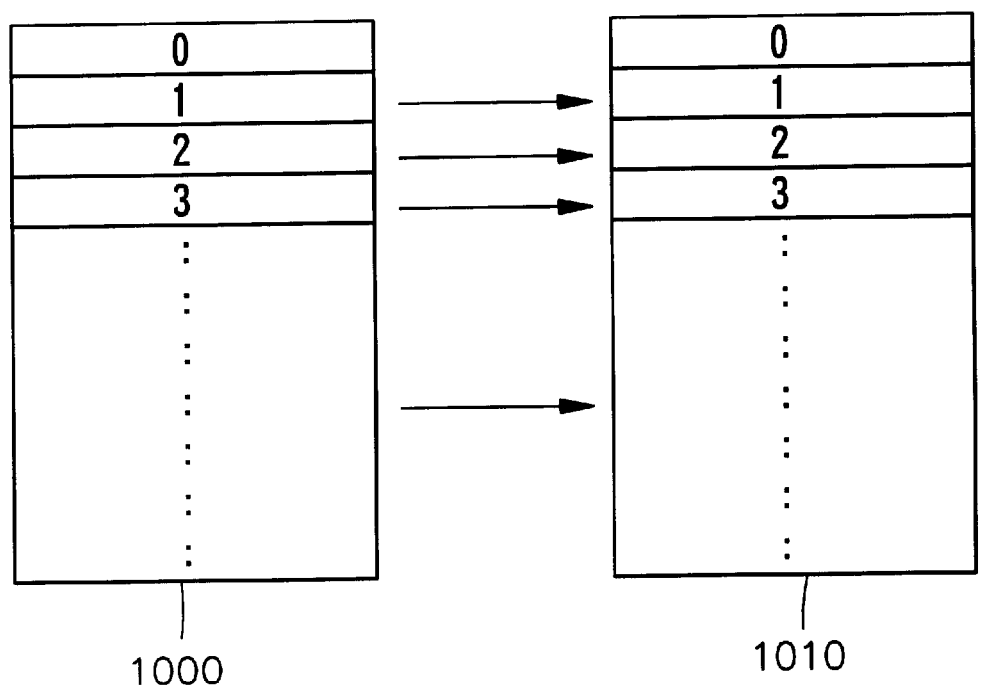
FIG. 10 is a block diagram showing the mother and child technique according to an embodiment of the present invention.

Refer to FIG. 10, which is a block diagram showing the mother and child technique according to an embodiment of the present invention. Therefore, in the flash memory device of the present invention, the erase action is avoided when repeatedly writing data to the same block and the move action is performed only when changing blocks. All data is written into the new block (child block) 1010 first. Then, the unchanged data is moved from the old block (mother block) 1000 into the new block 1010. By using this method, not only is the lifetime of the flash increased but the efficiency of the device is also increased.

Please refer to FIG. 11, which is a diagram showing the link table according to an embodiment of the present invention. Following is a write data example. The link table links a physical block address 1100 and a logical block address 1110. 32 sectors of data are to be written to flash which starts at block/page 0/0. The total physical block/logical block is 1024/992. The total spare blocks for the FIFO is 32. No blocks are defective. There are 32 pages per block.

Figure 12:
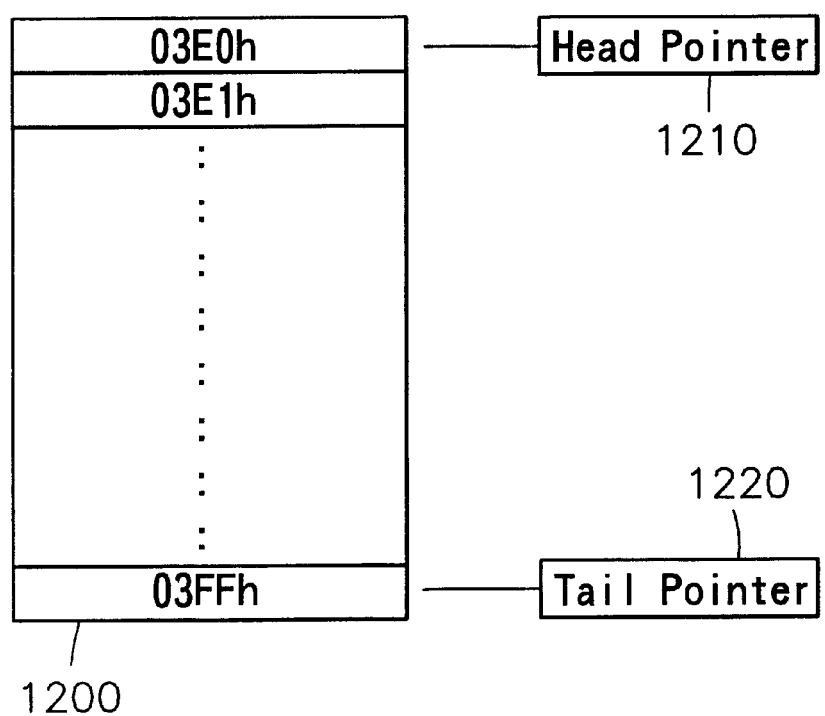
FIG. 12 is a diagram showing the head pointer and tail pointer operation of an embodiment of the present invention.
Figure 14:
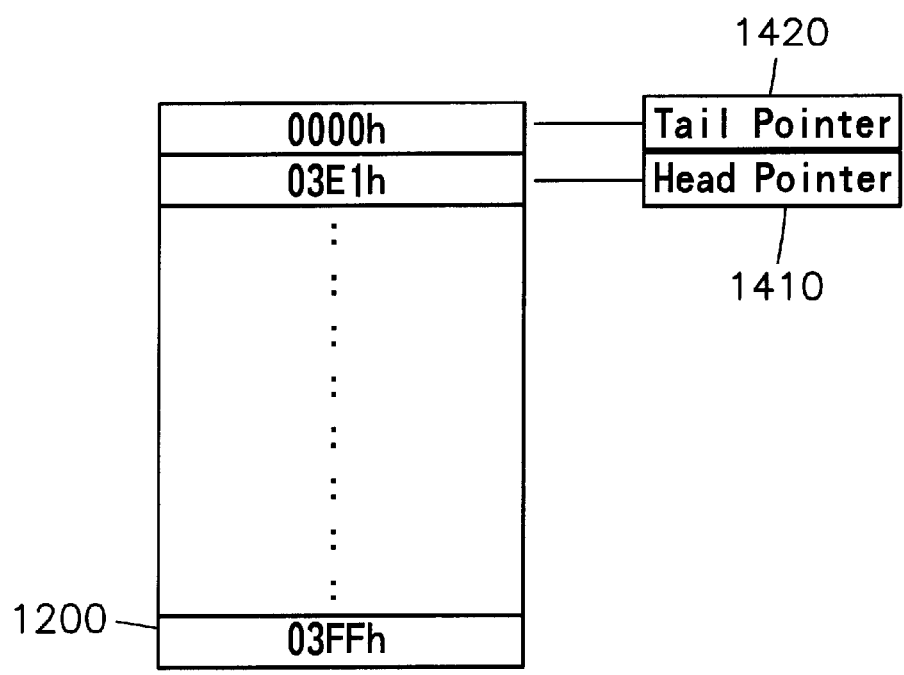
FIG. 14 is a diagram showing the head pointer and tail pointer operation of an embodiment of the present invention.

Refer to FIG. 12, which is a diagram showing the head pointer and tail pointer operation of an embodiment of the present invention, FIG. 13, which is a diagram showing the link table before programming according to an embodiment of the present invention, and FIG. 14, which shows the head pointer and tail pointer operation of an embodiment of the present invention. According to this example, child block 1300 number 03E0h, which is pointed to by the head pointer 1210 is taken from the FIFO spare region 1200. The head pointer 1410 is then incremented and 32 pages of data are programmed into the child block 1300.

Child block 1300 number 03E0h is filled into the mother block's 1310 logical block address 0000h in the link table. Mother block 1310 0000h is erased and the tail pointer 1220 is incremented. Then, mother block 1310 number 0000h is filled into the tail pointer 1420 point address in the spare region.

Reference will now be made to a description of a write procedure according to an embodiment of the present invention.

The USB Host writes the corresponding write command and the address parameter to the memory storage device which then begins execution of the program flash algorithm.

Figure 6:
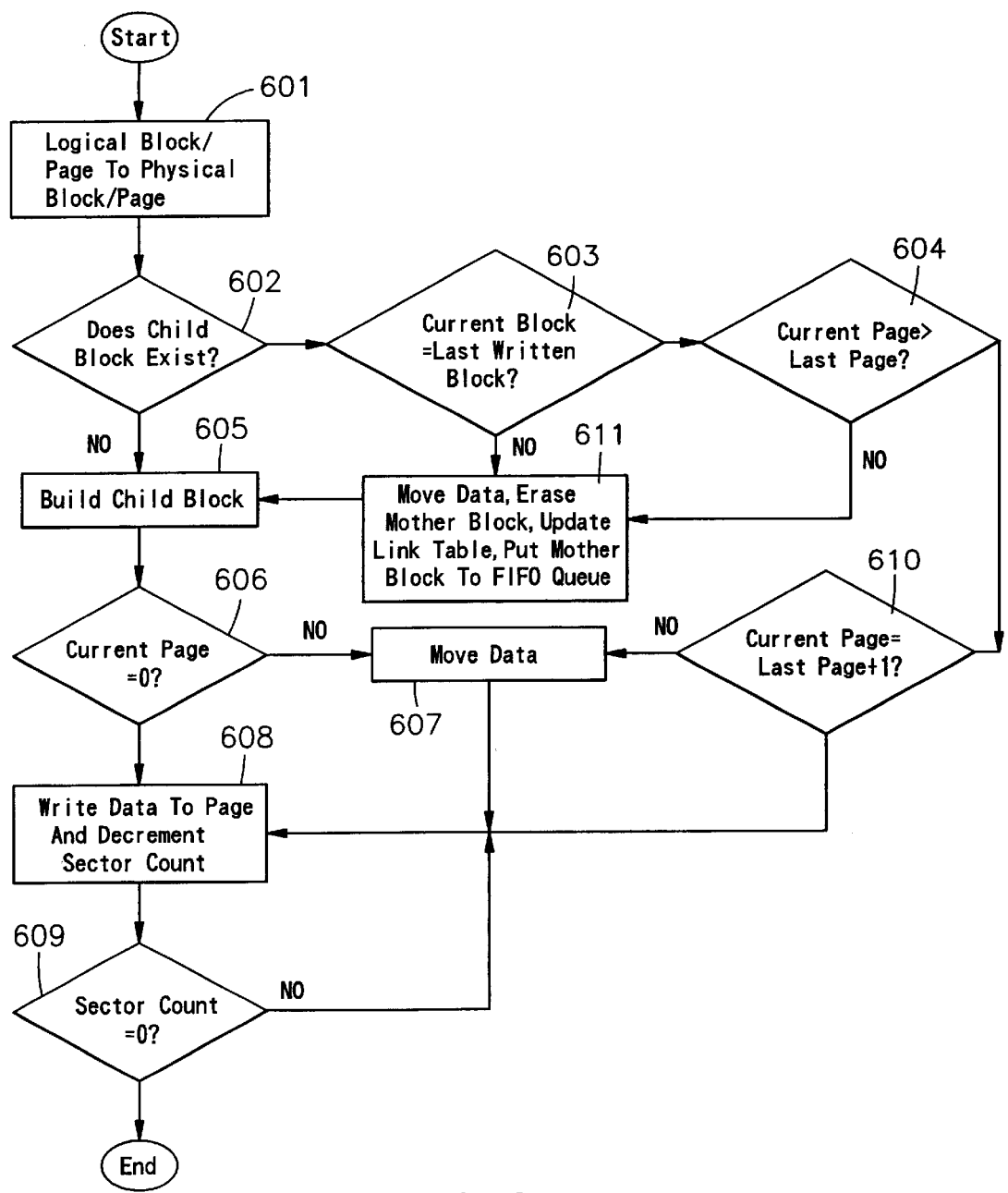
FIG. 6 is a flowchart showing the write procedure of the flash memory device according to an embodiment of the present invention.

Refer to FIG. 6, which is a flowchart showing the write procedure of the flash memory device according to an embodiment of the present invention.

First in Step 601, the logical address from the USB host is converted into flash memory physical block and page address.

Then in Step 602, the controller checks to see if a child block exists. If no child block exists, proceed to Step 605. If a child block exists, in Step 603, the current flash memory's logical block is checked to see if what is to be written is equal to the last flash memory logical block that was written. If it is not equal, proceed to Step 611.

If it is equal, in Step 604, the current flash memory logical page number is checked to see if what is to be written is larger than the last flash memory logical page that was written. If yes, proceed to Step 610, otherwise go to Step 611.

In Step 605, a clean block is taken from the FIFO queue to create a child block for the current write command.

In Step 606, the current flash memory logical page number is checked to see if what is to be written is equal to "0" or not. If equal to "0", proceed to Step 608.

If not equal to "0", in Step 607, the data from the mother block is moved to the child block between the "last page written" and the "current write page" sections.

In Step 608, the data from the host to the flash memory is programmed into the buffer and the sector count number is decremented.

In Step 609, if the sector count number is equal to "0", go to "End", otherwise go to Step 608.

In Step 610, if the current write page number is equal to the last write page number plus 1, go to Step 608, otherwise go to Step 607.

In Step 611, the data from the mother block is moved to the child block between the sections "last page written" and the "end page of this block", the mother block is erased, the link table in the controller is updated substituting the original mother block address with the child block address, and the erased mother block is put back into the FIFO queue as a clean block.

Figure 7:
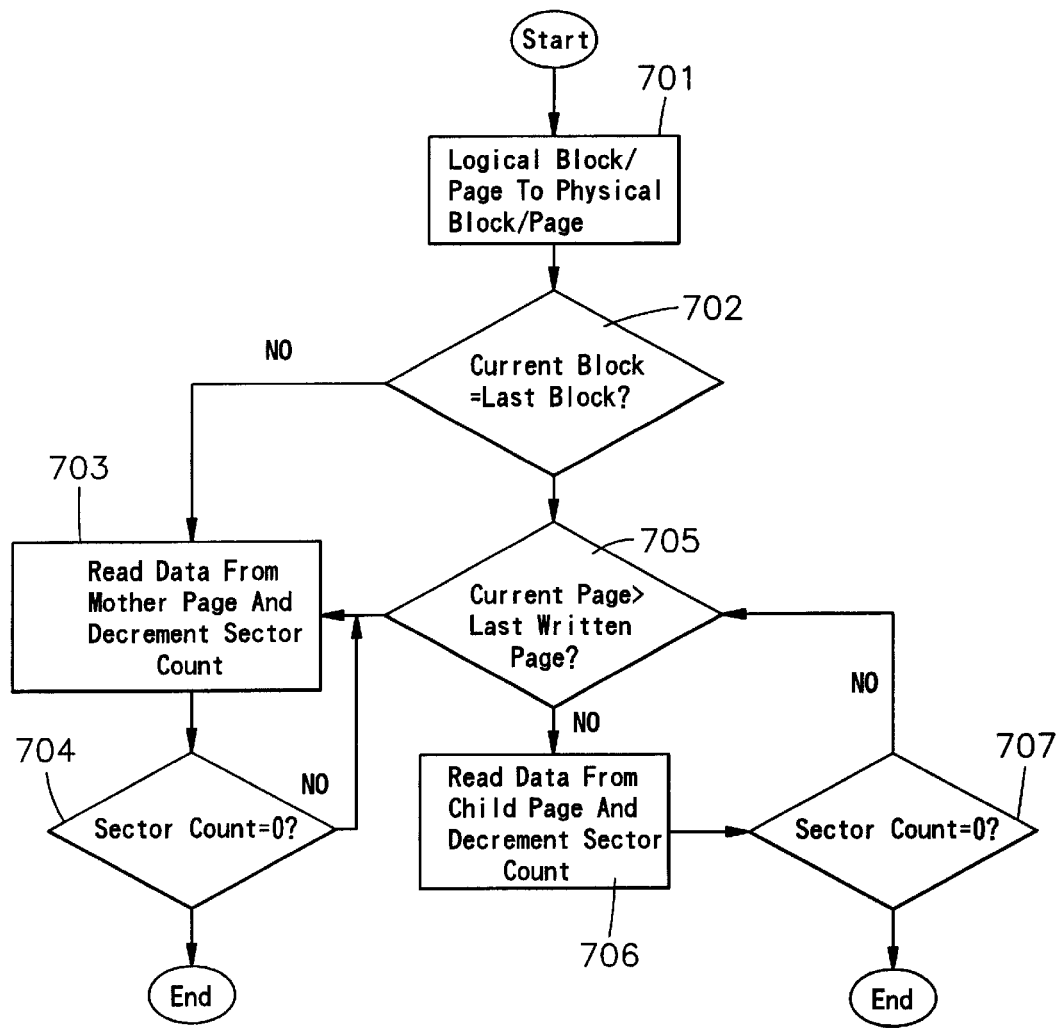
FIG. 7 is a flowchart showing the read procedure of the flash memory device according to an embodiment of the present invention.

Refer to FIG. 7, which is a flowchart showing the read procedure of the flash memory device according to an embodiment of the present invention.

In Step 701, the Logical Address from the USB host is converted to the flash memory physical block and page address.

In Step 702, the current flash memory logical block is checked to see if what is to be read is equal to the last flash memory logical block that was read. If yes, proceed to the Step 705, otherwise go to Step 703.

In Step 703, the data from the flash memory physical block and page is read and the sector count number is decremented.

In Step 704, the sector count number is checked to see if it is equal to "0". If equal to "0" go to "End", otherwise return to Step 703.

In Step 705, the current flash memory logical page is checked to see if what is to be read is larger than the last flash memory logical page that was written. If yes, proceed to the Step 703, otherwise go to Step 706.

In Step 706, the data from the child block physical block and page is read and the sector count number is decremented.

In Step 707, the sector count number is checked to see if it is equal to "0". If yes, then go to "END", otherwise go to Step 705.

Refer to FIG. 15, which shows a command packet according to an embodiment of the present invention. When the microprocessor begins to execute the command, the device will download its parameters from the host, for example, read or write, the vendor command packet is as shown in FIG. 15.

The system will judge the address mode by the Device/Head byte. The flash memory device of the present invention supports both the LBA and CHS mode.

If the host provides the address using LBA mode, the device will convert it into CHS mode and then change the CHS mode into the physical address.

When the device executes a read command, the controller will first read data from the flash memory, sector by sector to a buffer (512 bytes) in the controller, then this sector will be sent to the host by a USB engine. The whole command will be completed when the number of sectors that have been sent to the host is equal to the sector count.

When the device executes a write command, the controller will read data from the host by the USB engine sector by sector to a buffer (512 bytes) in the controller, and then this sector will be stored in the flash memory. The whole command will be completed when the number of sectors that have been sent to the flash memory is equal to the sector count.

The device can support more than one piece of flash memory. According to the present invention, multiple chip select pins are provided. When the device is initialized, it will check the type of the flash (the capacity) being used on board and how many chips the system has and the device will add up all the memory chips to find out the total capacity. When the host needs this kind of data, the device will provide the total capacity to the host, not just the capacity of one chip.

When the host sends a certain address (logic) to the device, the device will perform a calculation to find the exact chip and corresponding address that the host wants to access. Then the calculated address is used and the chip select pin is enabled.

Furthermore, the flash memory chip and controller as mentioned in the aforesaid description are of single chip design to minimize the dimensions of the universal serial bus flash memory integrated circuit device without the need of external RAM or ROM.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A universal serial bus flash memory integrated circuit device comprising:

a universal serial bus for connecting the flash memory device to a host computer;

at least one flash memory module for storing data;

a flash memory interface for controlling read and write commands sending to said at least one flash memory module having at least a mother block;

a flash memory extension interface for enabling the universal serial bus flash memory integrated circuit device to be electrically connected to external flash memories, a universal serial bus interface for communication between said at least one flash memory module and the host computer; and a controller for controlling commands and data between the host computer and the universal serial bus flash memory integrated circuit device and for managing data in the flash memory module, said controller comprising:

a system buffer for buffering between the host computer and the flash memory device;

a microprocessor for executing commands with parameters from the host; and a state machine for creating read and write timing to the system buffer;

wherein for writing data into the flash memory module, said controller checks whether or not a child block exist in the flash memory module;

if the child block exist in the flash memory module, the controller checks whether or not the data to be written is equal to a last memory logical block that was previously written;

if the data to be written is found to be not equal to the last memory logical block, the data is moved from the mother block to the child block, then the mother block is erased then a link table in the controller is undated substituting an original mother block address with a child address and the erased mother block is nut back into FIFO queue as a clean block;

if the data to be written is found to be equal to the last memory logical block, the controller checks whether the current flash memory logical page number to check the data to be written is larger than the flash memory logical page;

if a current write pane number is equal to a last write ease number plus 1, the data from the host to the flash memory module is written in the system buffer and the sector count is decremented, and if the child block does not exist, a clean block is taken from the FIFO queue to create a child block in response to a write command, the controller checks whether or not the data to be written is equal to 0;

if the data to be written is not equal to 0, the controller moves the data from the mother block to the child block between the last page written and the current write page sections and if the sector count number is equal to 0, the writing operation is ended.

2. The universal serial bus flash memory integrated circuit device of claim 1, wherein said controller controls transmission of data to and from the host computer.

3. The universal serial bus flash memory integrated circuit device of claim 1, wherein said controller controls said universal serial bus interface.

4. The universal serial bus flash memory integrated circuit device of claim 1, wherein said controller receives commands from the host computer.

5. The universal serial bus flash memory integrated circuit device of claim 1, wherein said controller provides a status to the host computer.

6. The universal serial bus flash memory integrated circuit device of claim 1, wherein said microprocessor reads commands and parameters from said system buffer.

7. The universal serial bus flash memory integrated circuit device of claim 1, wherein said microprocessor executes commands with parameters from the host computer.

8. The universal serial bus flash memory integrated circuit device of claim 1, wherein said microprocessor manages and maps universal serial bus address to said system buffer while receiving or transferring data to and from the host computer.

9. The universal serial bus flash memory integrated circuit device of claim 1, wherein said microprocessor manages commands of erase, program, and reed for said at least one flash memory module.

10. The universal serial bus flash memory integrated circuit device of claim 1, wherein said microprocessor executes addressing methods subject to an algorithm of said controller.

11. The universal serial bus flash memory integrated circuit device of claim 1, wherein said microprocessor manages system buffer addresses.

12. The universal serial bus flash memory integrated circuit device of claim 1, wherein said microprocessor further comprises:

a ROM for storing program code of said controller and a RAM for use by said controller when executing commands.

13. The universal serial bus flash memory integrated circuit device of claim 1, further comprising an extended memory board connected to said flash memory extension interface for extending memory for the universal serial bus flash memory integrated circuit device.

14. A universal serial bus flash memory integrated circuit device comprising:

a universal serial bus for connecting the flash memory device to a host computer;

at least one flash memory module for storing data;

a flash memory interface for controlling read and write commands sending to said at least one flash memory module;

a flash memory extension interface for enabling the universal serial bus flash memory integrated circuit device to be electrically connected to external flash memories;

a universal serial bus interface for communication between said at least one flash memory module and the host computer, and a controller for controlling commands and data between the host computer and the universal serial bus flash memory integrated circuit device and for managing data in the flash memory module, wherein for reading data from the flash memory module;

a Logical Address from the host is converted to a flash memory physical block and page address;

the controller checks whether or not a current flash memory Logical block in which the data is to be read is equal to a last flash memory Logical block;

if yes, the controller checks whether or not the sector count number is equal to 0; if yes, the reading ends;

if not, the data from the flash memory physical block and the page is read and the sector count number is decremented;

the controller checks whether or nor the data to read from a current flash memory logical page is larger than a last flash memory logical page that was written;

if yes, the controller checks whether or not the sector count number is equal to 0; if the sector count number is equal to 0, the reading ends; and if not, the data from the child block physical black and page is read and the sector count number as decremented.

* * * * *